US008601065B2

(12) United States Patent
Lin et al.

(10) Patent No.: US 8,601,065 B2
(45) Date of Patent: Dec. 3, 2013

(54) METHOD AND APPARATUS FOR PREVENTING OUTGOING SPAM E-MAILS BY MONITORING CLIENT INTERACTIONS

(75) Inventors: Frank C. Lin, Saratoga, CA (US); Xiangrong Wang, Milpitas, CA (US); Hang Shi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1480 days.

(21) Appl. No.: 11/444,203

(22) Filed: May 31, 2006

(65) Prior Publication Data

US 2007/0282955 A1 Dec. 6, 2007

(51) Int. Cl.
*G06F 15/16* (2006.01)

(52) U.S. Cl.
USPC ............ 709/206; 709/224; 709/225; 709/226

(58) Field of Classification Search
None
See application file for complete search history.

(56) References Cited

U.S. PATENT DOCUMENTS 6,671,811 B1 * 12/2003 Diep et al. .................... 726/23
6,868,450 B1 * 3/2005 Lucovsky .................... 709/229
7,089,508 B1 * 8/2006 Wright .................... 715/867
7,293,291 B2 * 11/2007 Gonsalves et al. .................... 726/26
7,386,520 B2 * 6/2008 Hehl et al. .................... 705/400
7,444,380 B1 * 10/2008 Diamond .................... 709/206
7,472,422 B1 * 12/2008 Agbabian .................... 726/25
7,548,956 B1 * 6/2009 Aoki et al. .................... 709/207
7,552,186 B2 * 6/2009 Werner et al. .................... 709/207
7,617,328 B2 * 11/2009 Lewis et al. .................... 709/246
7,634,808 B1 * 12/2009 Szor et al. .................... 726/22
7,636,943 B2 * 12/2009 Gruper et al. .................... 726/22
7,730,137 B1 * 6/2010 Toomey .................... 709/206
7,818,802 B2 * 10/2010 Szor et al. .................... 726/22
8,321,511 B1 * 11/2012 Friend et al. .................... 709/206
2001/0033657 A1 * 10/2001 Lipton et al. .................... 380/201
2002/0013854 A1 * 1/2002 Eggleston et al. .................... 709/234
2002/0062450 A1 * 5/2002 Carlson et al. .................... 713/200
2003/0131061 A1 * 7/2003 Newton et al. .................... 709/206
2003/0131063 A1 * 7/2003 Breck .................... 709/206
2003/0154394 A1 * 8/2003 Levin .................... 713/200
2003/0220978 A1 * 11/2003 Rhodes .................... 709/206
2004/0015554 A1 * 1/2004 Wilson .................... 709/206
2004/0199597 A1 * 10/2004 Libbey et al. .................... 709/207
2004/0219928 A1 * 11/2004 Deeds .................... 455/456.1
2005/0091537 A1 * 4/2005 Nisbet et al. .................... 713/201
2005/0187839 A1 * 8/2005 Butera et al. .................... 705/32

(Continued)

OTHER PUBLICATIONS

Gallagher, Robert The problems associated with operating an effective anti-spam "blocklist" system in an increasingly hostile environment,' Aug. 30, 2004, pp. 1-10.

(Continued)

*Primary Examiner* — Ian N Moore
*Assistant Examiner* — Dung B Huynh
(74) *Attorney, Agent, or Firm* — P. Su

(57) ABSTRACT

Methods and apparatus for preventing spam e-mail messages from being propagated or transmitted by monitoring user interaction events associated with the system are disclosed. According to one aspect of the present invention, a method for processing a first e-mail message on a system that transmits e-mail message and has an input device includes identifying an attempt to transmit the first e-mail message; and determining whether a user interaction event has occurred within a given time interval. If it is determined that a user interaction event has not occurred within the given time interval, the first e-mail message is prevented from being transmitted.

30 Claims, 8 Drawing Sheets

404
APPLICATION
438
SPAM C
430
MACHINE ACTIVITY DETECTOR
410
414
422
SPAM A
E-MAIL APPLICATION
406
SPAM B
426
NETWORK ACTIVITY DETECTOR
418
SPAM DETECTOR
COMPROMISED MACHINE
408
E-MAIL APPLICATION
434
CLIENT SYSTEM

(56) References Cited

U.S. PATENT DOCUMENTS

| | | | | |
|---|---|---|---|---|
| 2005/0188028 | A1* | 8/2005 | Brown et al. | 709/206 |
| 2005/0198175 | A1* | 9/2005 | Thomas et al. | 709/206 |
| 2006/0075501 | A1* | 4/2006 | Thomas et al. | 726/24 |
| 2006/0095521 | A1* | 5/2006 | Patinkin | 709/206 |
| 2006/0095970 | A1* | 5/2006 | Rajagopal et al. | 726/25 |
| 2006/0117384 | A1* | 6/2006 | Larson et al. | 726/22 |
| 2006/0168024 | A1* | 7/2006 | Mehr et al. | 709/206 |
| 2006/0168057 | A1* | 7/2006 | Warren et al. | 709/206 |
| 2006/0200435 | A1* | 9/2006 | Flinn et al. | 706/12 |
| 2006/0233280 | A1* | 10/2006 | Tynderfeldt et al. | 375/299 |
| 2006/0250954 | A1* | 11/2006 | Mulrane et al. | 370/229 |
| 2006/0288076 | A1* | 12/2006 | Cowings et al. | 709/206 |
| 2007/0028303 | A1* | 2/2007 | Brennan | 726/24 |
| 2007/0101010 | A1* | 5/2007 | Ellison et al. | 709/229 |
| 2007/0150957 | A1* | 6/2007 | Hartrell et al. | 726/24 |
| 2008/0104712 | A1* | 5/2008 | Oliver et al. | 726/27 |
| 2008/0146215 | A1* | 6/2008 | Oota | 455/422.1 |
| 2009/0044006 | A1* | 2/2009 | Shim et al. | 713/151 |
| 2010/0082465 | A1* | 4/2010 | Drucker et al. | 705/32 |
| 2012/0084375 | A1* | 4/2012 | Haskins et al. | 709/206 |

OTHER PUBLICATIONS

Aycock, John et al. "Spam Zomibes from Outer Space," Jan. 2006, TR 2006-808-01, pp. 1-16.

Zhong, Zhenyu et al., Throttling Outgoing SPAM for Webmail Services, pp. 1-8, Proceedings of the Second Conference on Email and Anti-Spam (CEAS), Jun. 2005.

Bishop, Matt, "Spam and the CAN-SPAM Act", pp. 1-25, Expert Reports, Federal Trade Commission, Dec. 2005.

Clayton, Richard, "Stopping Outgoing Spam by Examining Incoming Server Logs," pp. 1-5, Proceedings of the Second Conference on Email and Anti-Spam (CEAS), Jun. 2005.

Clayton, Richard, "Stopping Spam by Extrusion Detection," pp. 1-8, Proceedings of the First Conference of Email and Anti-Spam (CEAS), Jun. 2004.

Cook, Duncan et al., "Catching Spam Before it Arrives: Domain Specific Dynamic Blacklists," pp. 1-10, Fourth Australasian Information Security Workshop, 2006.

Crocker, Dave et al., "Challenges to Anti-Spam Efforts," Internet Protocol Journal—vol. 8, No. 4, pp. 1-6, Dec. 2005.

* cited by examiner

METHOD AND APPARATUS FOR PREVENTING OUTGOING SPAM E-MAILS BY MONITORING CLIENT INTERACTIONS

BACKGROUND OF THE INVENTION

1. Field of Invention

The present invention relates generally to systems for preventing spam e-mails. More particularly, the present invention relates to preventing spam e-mails from being sent by or via an unsuspecting client machine.

2. Description of the Related Art

Spam is a well-known and serious problem in networks. The volume of spam that is sent through networks is ever increasing, and bandwidth that may otherwise be used for legitimate purposes is used to propagate spam. Users of e-mail are often inundated with spam, and must often spend a significant amount of time sorting through received e-mail messages to identify legitimate e-mail messages.

There are many types of spam. Some spam is sent directly from a server associated with an entity that purposefully propagates spam. Other spam is sent via unsuspecting systems or machines which have effectively been taken over by an entity that intends to propagate spam using the unsuspecting systems. In other words, a system may effectively be broken into and compromised, causing that system to be turned into a zombie system that sends out spam e-mail messages without the knowledge of an owner or user of the system.

FIG. 1 is a diagrammatic representation of a network in which a local machine is used by a server to propagate spam e-mail. In an overall network 100, a spam originating source 104, which may be a server, may send spam e-mail via a local machine 108 to network elements 116, or client machines, that are a part of a network 112. It should be appreciated that network 112 may be a part of overall network 100.

In some instances, a machine 108, e.g., a local machine, may act as a zombie, or a machine that unknowingly creates and sends spam to network elements 116. Spam originating source 104 may relegate machine 108 to zombie status by employing, for example, Trojan horse applications, viruses, or worms. Once machine 108 has been hijacked by spam originating source 104, generally unbeknownst to an owner, machine 108 may be controlled by spam originating source 104 to send spam e-mail messages or may automatically send spam e-mail messages.

Generally, spam control mechanisms are used by internet service provider (ISP) servers and receivers of e-mail messages in an attempt to control spam. ISP servers may utilize filters to identify spam e-mail messages, and to prevent the spam e-mail messages from being further transmitted. With reference to FIG. 2, the use of a filter or a log analyzer in an ISP server to prevent spam from being transmitted through a network will be described. A spam source 204 creates spam intended for elements or systems 216 in a network 212. The spam intended for elements 216 is transmitted from spam source 204 to ISP server 208. ISP server 208 includes a filter or traffic log analyzer 220 that identifies spam and prevents spam from being propagated to elements 216. Using filter or traffic log analyzer 220, ISP server 208 may analyze inbound traffic to identify spam.

While filter or traffic log analyzer 220 is effective in identifying spam and preventing further propagation of spam, the spam that is sent by spam source 204 utilizes valuable bandwidth on network connections or communications links between spam source 204 and ISP server 208. In other words, although filter or traffic log analyzer 220 may reduce the amount of spam received by elements 216 and transmitted on network connections between ISP server 208 and elements 216, the amount of spam on network connections between spam source 204 and ISP server 208 is not reduced.

Client systems, e.g., receivers of e-mail messages, may also identify spam and prevent spam from inundating a preferred mailbox in an e-mail application. FIG. 3 is a diagrammatic representation of a system in which a receiver of spam e-mail filters out the spam e-mail. Spam 328 that is received on receiver 316 is processed by a filter 324. Filter 324 is arranged to identify spam such that a user associated with receiver 316 does not have to sort through all received e-mail messages to differentiate between legitimate e-mail messages and spam e-mail messages. While filter 324 is often effective for identifying spam 328, by the time spam 328 reaches receiver 316, spam 328 has been propagated through a network (not shown). Hence, overall network spam traffic is not reduced by the use of filter 324.

Filtering out spam before spam is sent by a spam source, e.g., an agent such as a zombie, prevents the spam from being sent through a network. In addition to reducing network spam traffic, filtering out spam before spam is sent on a network reduces the volume of spam that potentially reaches a receiver. Spam control mechanisms used to prevent spam from being sent by a spam source generally utilize worm removal and anti-virus measures. For example, zombies are often created using mass mailer worms. An anti-virus agent may scan the zombie and remove a mass mailer worm, provided the anti-virus agent knows the virus signature associated with the mass mailer worm. Anti-virus agents generally include dictionaries of virus signatures that are constantly updated when new worms or viruses are identified. The use of anti-virus agents is typically effective in preventing the transmission of spam by mass mailer worms. However, until the virus signature of a mass mailer worm is identified, an anti-virus agent is unable to remove the mass mailer worm. In other words, new mailer worms or viruses which cause a local machine to become a zombie are likely not to be identified until after they have already caused spam to be transmitted. Further, the need for a creator of an anti-virus agent to identify new virus signatures, as well as the need to subsequently use the anti-virus agent to remove worms or viruses with the identified virus signatures, utilizes a significant amount of overhead.

Therefore, what is needed is a low overhead method and apparatus that prevents spam from being transmitted to an ISP server or through a network. That is, what is desired is a system which enables spam e-mail messages to be identified prior to transmission from a spam source.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Local or client machines that are hijacked by viruses or worms may become zombies. When a local machine becomes a zombie, the local machine may be used to generate spam without the knowledge of the owner of the local machine. Often, spam that is sent by zombies is sent as mass mailings using e-mail addresses harvested from the zombies. Although internet service provider (ISP) servers and receivers of spam may be able to filter out some of the spam, the ability to stop spam before it is transmitted reduces the total amount of network spam traffic and, hence, frees up network bandwidth for legitimate purposes.

It has been observed that a relatively large percentage of legitimate e-mail messages, e.g., e-mail messages that are intentionally sent by a user of a local machine, are sent with certain user interactions. Such user interactions may include such interactions as keyboard activities, mouse clicks, or their equivalents. That is, user interactions that involve input/output devices of a local machine are typically used to send legitimate e-mail messages.

By using heuristic algorithms or otherwise determining whether a user interaction event was performed within a predetermined time interval before an attempt to send an e-mail message, it may be determined whether the e-mail message is likely to be spam. That is, intentability may be used as a measure of whether an e-mail message is intentionally sent by a local machine. Intentability may be determined by substantially any suitable algorithm, as for example an algorithm that keeps track of a timestamp associated with a last user interaction event and determines if the last user interaction event transpired within a given amount of time before an attempt to send an e-mail message.

Intentional e-mail messages and unintentional e-mail messages may both be legitimate. Typically, intentional e-mail messages are forwarded from a mail user agent such as an e-mail application. Unintentional e-mail messages include spam e-mail messages, but may also include system error messages. Intentability is a measure that may be used to effectively quantify the likelihood that that an outgoing e-mail message, i.e., an e-mail message that is being transmitted from or via a local machine, is a spam e-mail message.

Figure 1:
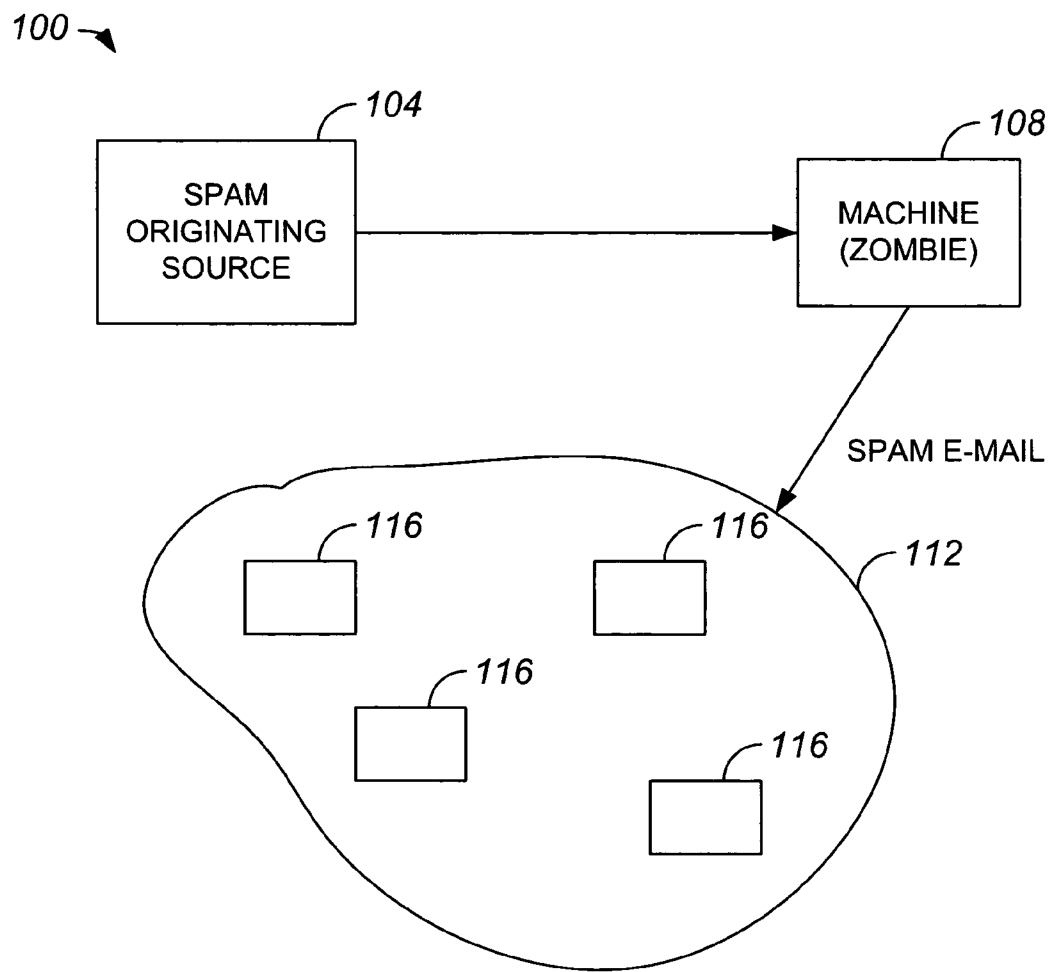
FIG. 1 is a diagrammatic representation of a system in which an unsuspecting machine is used by a source to propagate spam e-mail.
Figure 2:
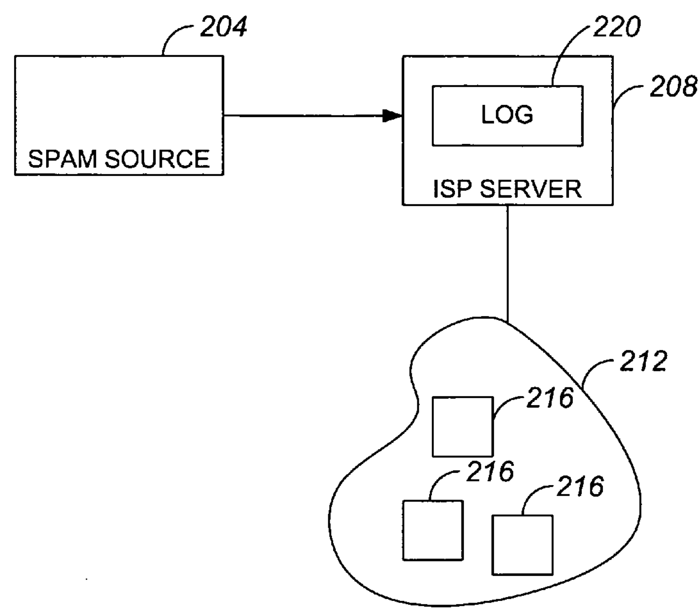
FIG. 2 is a diagrammatic representation of a system in which a spam e-mail sent by a source may be filtered out by an internet service provider (ISP) server.
Figure 3:
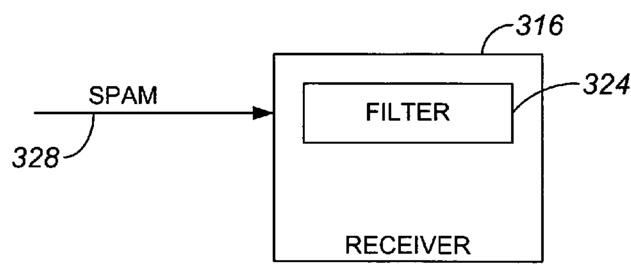
FIG. 3 is a diagrammatic representation of a system in which a receiver of spam e-mail filters out the spam e-mail.
Figure 4:
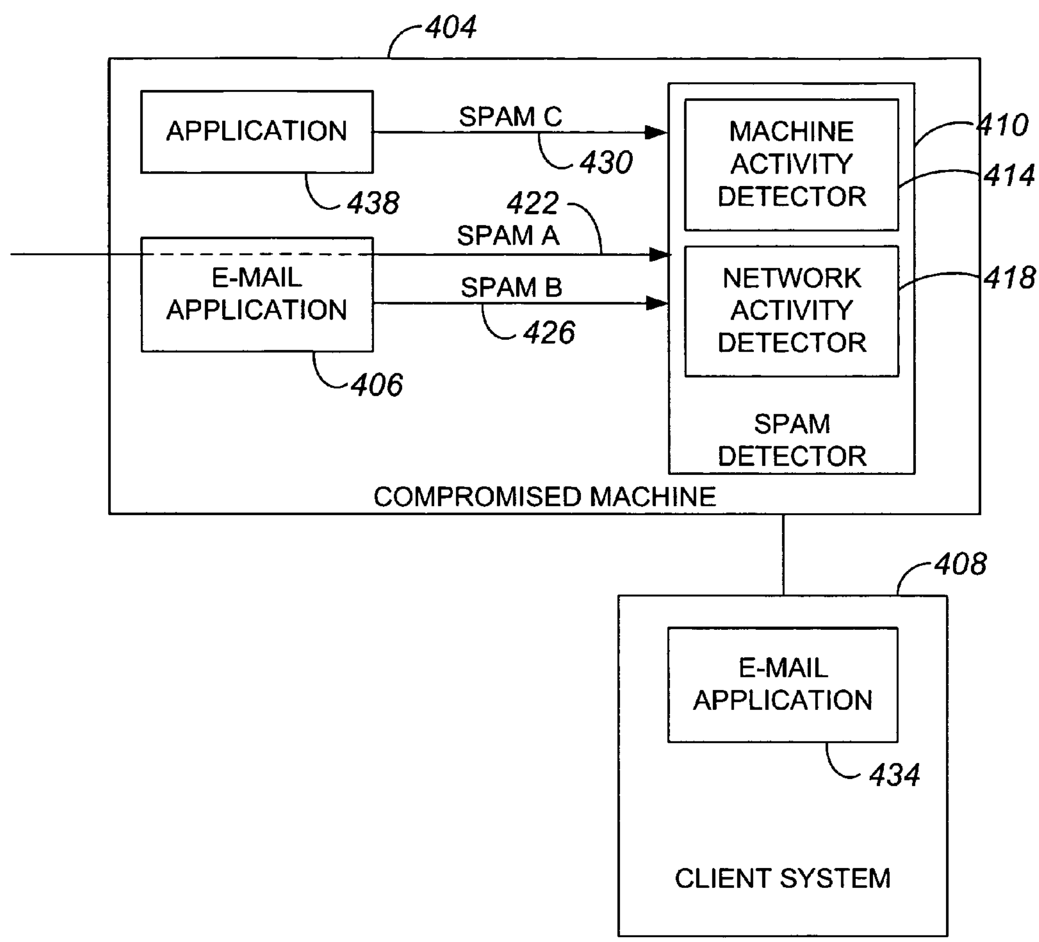
FIG. 4 is a block diagram representation of a system in which a spam e-mail detector of a local machine detects spam e-mail before the spam e-mail is sent by or sent via the local machine in accordance with an embodiment of the present invention.

A spam e-mail detector may be arranged to use intentability as a measure of whether an e-mail message is likely to be a spam e-mail message. Referring to FIG. 4, a spam e-mail detector that is suitable for use in a compromised machine to stop zombie spam and other spam will be described in accordance with an embodiment of the present invention. A compromised machine 404, which may be a local machine, includes a spam e-mail detector 410 that is arranged to process e-mail messages that are to be sent from compromised machine 404 to a client or receiver system 408. Although e-mail messages sent between compromised machine 404 and client system 408 generally pass through an ISP server, an ISP server is not shown for ease of illustration. An e-mail application 406, or a mail user agent, is compromised such that it initiates spam 426. Further, e-mail application 406 may be arranged to allow spam 422 that originates from another machine, e.g., a spam source machine, to be sent via compromised machine 404. Other applications such as application 438 may also be arranged to originate spam 430.

Substantially all spam 422, 426, 430 and, additionally, all legitimate e-mail (not shown) sent by applications 406, 438 is processed by spam e-mail detector 410. Spam e-mail detector 410 is arranged to prevent spam 422, 426, 430 from being sent to an e-mail application 434 of client system 408, while enabling legitimate e-mail (not shown) to be transmitted to e-mail application 434.

Spam e-mail detector 410 includes a machine activity detector 414 and a network activity detector 418. Machine activity detector 414 is arranged to determine whether a user interaction event has occurred in compromised machine 404 within an intent interval, or a predetermined time interval, before an attempt was made to transmit an e-mail message. If no user interaction event has occurred within an intent interval, then spam e-mail detector 410 typically classifies the e-mail message that was attempted to be transmitted as spam. In other words, spam 422, 426, 430 is generally detected and prevented from being sent to client system 408 if machine activity detector 414 does not detect a user interaction event within an intent interval once a transmission attempt is made.

Network activity detector 418 is arranged to monitor network traffic to determine when an attempt is made to send an e-mail message. Attempts to send spam 422, 426, 430 are typically detected by network activity detector 418 as attempts to send an e-mail message. When network activity detector 418 determines that an attempt was made to send an e-mail message, spam e-mail detector 410 determines whether the intentability associated with the e-mail message indicates that the e-mail message is spam 422, 426, 430.

Figure 5:
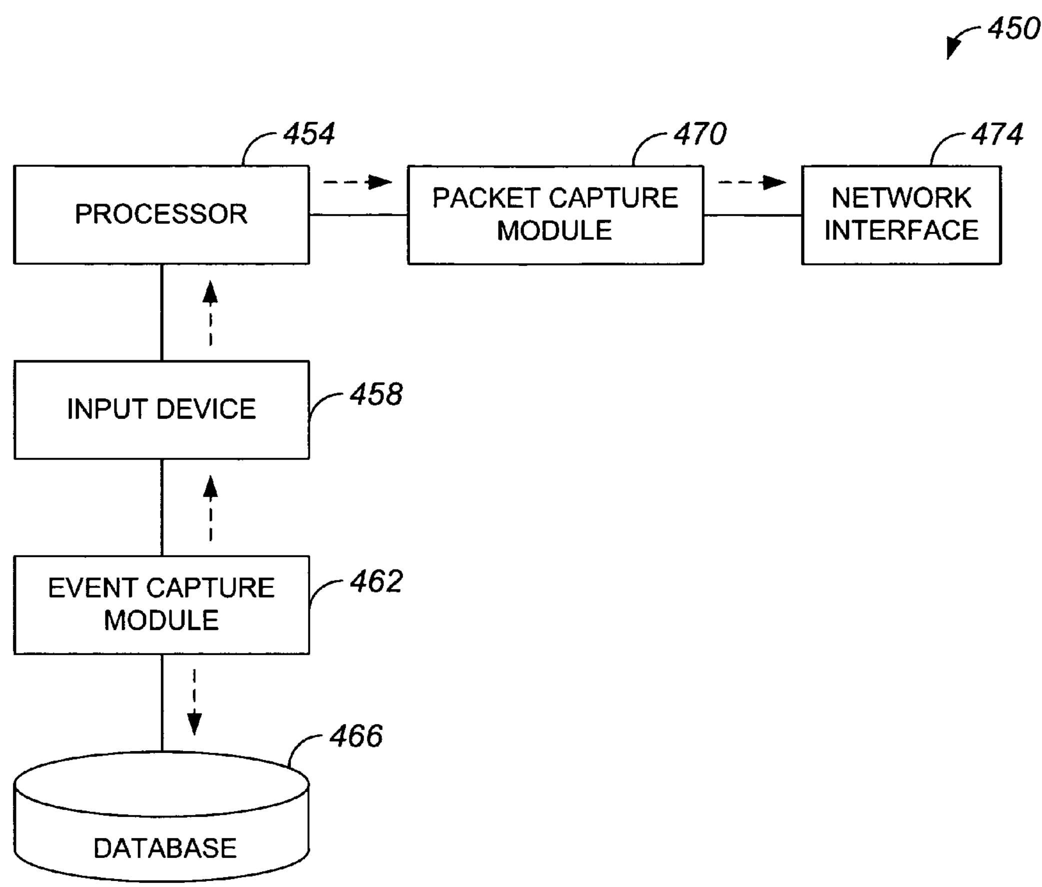
FIG. 5 is a block diagram of components of a computing system which may be used to detect spam e-mail in accordance with an embodiment of the present invention.

FIG. 5 is a block diagram which illustrates a machine that is arranged to prevent the transmission of spam in accordance with an embodiment of the present invention. A machine 450, e.g., a machine that is arranged to prevent zombie spam from being sent, includes a processor 454 that allows network traffic to be provided to a network interface 474 which, in one embodiment, may be a network interface card (NIC). Processor 454, which is often a central processing unit, is arranged such that an input device 458 causes processor 454 to take action. Input device 458 may be a keyboard or a mouse. In general, input device 458 may be substantially any device which allows for user interaction with local machine 450 to occur. Other suitable devices may include, but are not limited to, voice recognition software and hardware, a touch sensitive pad, and a remote presentation pointer.

When input device 458 is used by a user, i.e., when a user interaction event occurs, the event is captured by an event capture module 462. For example, event capture module 462 captures keyboard and mouse events. In one embodiment, event capture module 462 places a timestamp on each event that is captured, and stores the captured and stamped events in a database 466. Database 466 may be substantially any suitable database such as a lightweight database.

When processor 454 causes a packet to be sent towards network interface 474, a packet capture module 470 captures the packet. That is, the packets or network traffic sent by processor 454 are intercepted and analyzed by packet capture module 470. Analysis may be performed by packet capture module 470 to identify the type of traffic with which a captured packet is associated, e.g., whether an intercepted packet is associated with an e-mail message. In general, event capture module 462 and packet capture module 470 are associated with a spam detector such as spam e-mail detector 410 of FIG. 4. Specifically, event capture module 462 may be associated with machine activity detector 414 of FIG. 4, while packet capture module 470 may be associated with network activity detector 418 of FIG. 4.

Figure 6A:
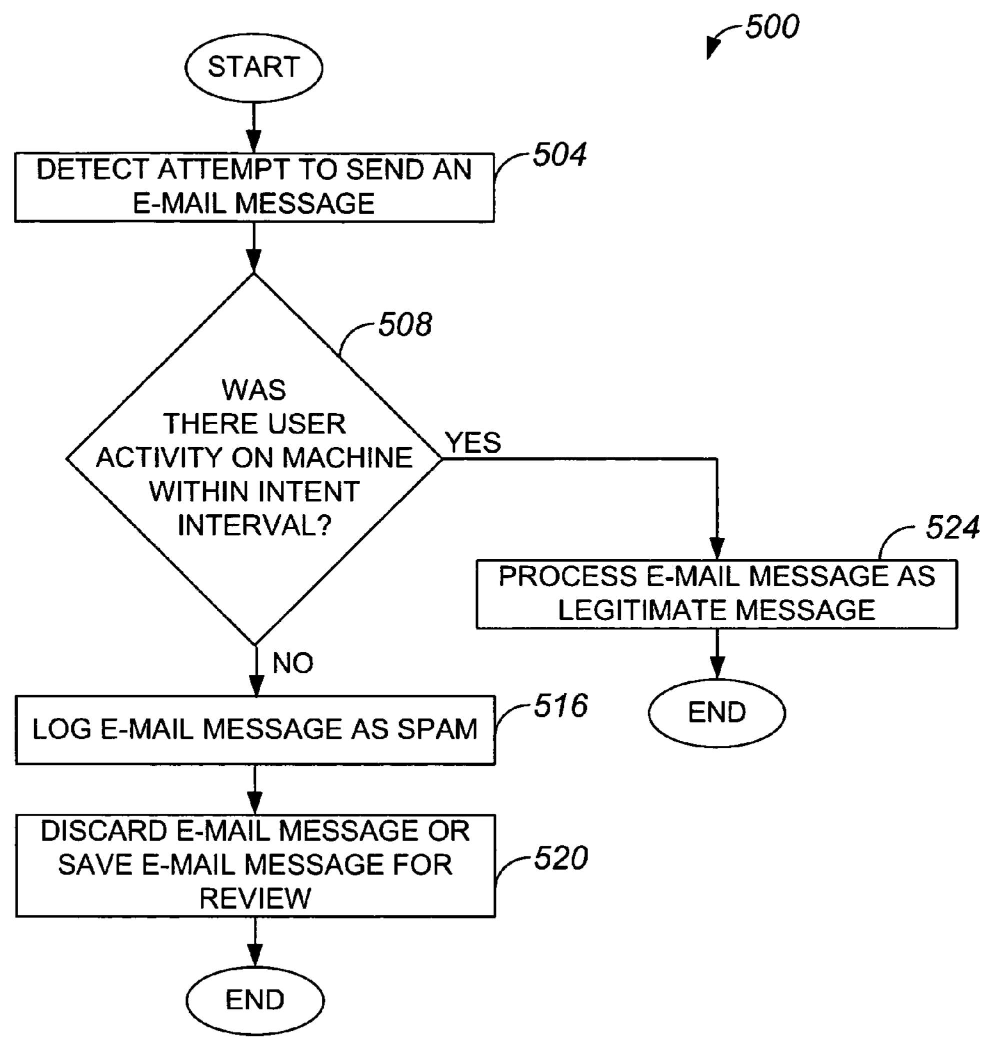
FIG. 6A is a process flow diagram which illustrates one method of processing e-mail on a local machine in accordance with an embodiment of the present invention.

With reference to FIG. 6A, one method of using a spam e-mail detector to prevent spam e-mails from being propagated by a machine or computing system will be described in accordance with an embodiment of the present invention. A method 500 of processing an e-mail message using a spam e-mail detector begins at step 504 in which an attempt to send an e-mail message is detected. One method of detecting an attempt by the machine to send an outgoing e-mail message will be described below with reference to FIG. 6C.

When an attempt to send an e-mail message is detected, then it is determined in step 508 whether there was user activity on the machine has occurred within an intent interval. That is, through a heuristic algorithm or an event capture algorithm, a determination is made regarding whether a user of the machine has performed an input/output activity within a particular time interval. The steps associated with one method of determining whether there has been user activity on the machine within an intent interval will be discussed below with reference to FIG. 6B.

If the determination is that there has been user activity on the potentially compromised machine within the intent interval, the indication is that the e-mail message has a relatively high likelihood of being intended e-mail. As such, process flow moves from step 508 to step 524 in which the e-mail message is processed as a legitimate message. Processing the e-mail message as a legitimate message generally includes allowing the e-mail message to be sent from the machine to an external destination. Once the e-mail message is processed as a legitimate e-mail message, the processing of the e-mail message is completed.

Alternatively, if the determination in step 508 is that there was no user activity on the machine within the intent interval, then the e-mail message is considered likely to be a spam e-mail message. Hence, the e-mail message is logged as spam in step 516. In one embodiment, logging the e-mail message as spam provides a user or a system administrator with an indication that the machine may be a zombie, thereby providing the user or the system administrator with warning that the machine may be infected with a virus, or may be remotely controlled by a spam source. The e-mail message is either discarded or saved for review in step 520. Some machines may be configured to discard substantially all e-mails identified as potentially being spam e-mails, while others may be configured to save all unsent e-mail messages such that a user or a system administrator may make a final determination of whether the unsent e-mail messages are indeed spam e-mails. After the e-mail message is either discarded or saved, the processing of the e-mail message is completed.

Figure 6B:
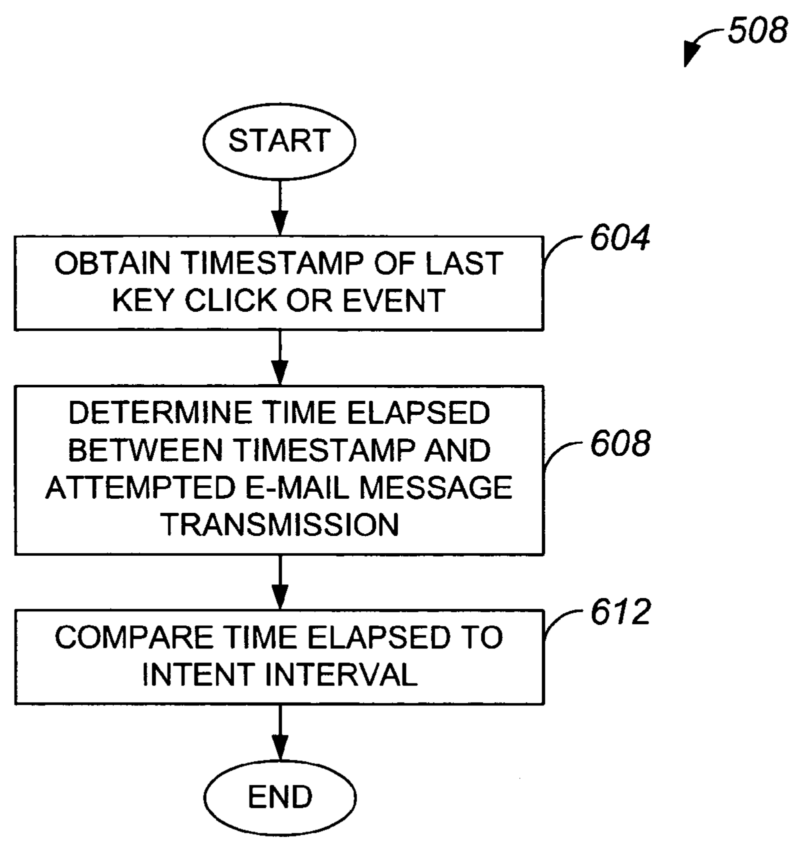
FIG. 6B is a process flow diagram which illustrates one method of determining whether there was user activity on a local machine within an intent interval, e.g., step 508 of FIG. 6A, in accordance with an embodiment of the present invention.

FIG. 6B is a process flow diagram which illustrates one method of determining whether user activity has occurred on the machine within an intent interval in accordance with an embodiment of the present invention. That is, FIG. 6B illustrates a method for determining intentability of an e-mail message associated with step 508 of FIG. 6A. It should be appreciated that substantially any heuristic algorithm may be used to determine whether user activity has occurred within an intent interval. Process 508 begins at step 604 in which the timestamp of a last key click or user interaction event is obtained. Such a timestamp may be stored, in one embodiment, in a database of the local machine and obtained by indexing into the database. Alternatively, such a timestamp may be stored in substantially any memory that is associated with the local machine.

After the timestamp of the last key click or user interaction event is obtained, the amount of time that has elapsed between the timestamp and the attempted e-mail message transmission is determined in step 608. Determining the amount of elapsed time may include, but is not limited to, obtaining a current system time from the machine and comparing the system time to the timestamp. Once the amount of elapsed time is determined, the amount of elapsed time is compared in step 612 to an intent interval. The intent interval may vary depending upon the heuristic algorithm used to determine intentability. Heuristic algorithms may take into account various factors such as human behavioral factors when an intent interval is assigned. By way of example, a longer intent interval may be assigned for users with physical limitations than would be assigned for users with no physical limitations. When the comparison between the elapsed amount of time and the intent interval is made, the process of determining intentability of an e-mail message is completed.

As previously mentioned, an intent interval may vary widely. The selection of an appropriate interval may take into account a variety of different factors. For instance, some systems may have e-mail applications may be preset to have a send and receive schedule such that once an e-mail message is composed, there may be a predetermined delay before the e-mail message is sent. In such systems, the intent interval is generally set to be relatively long to prevent the delayed sending of e-mail messages from resulting in the e-mail from being identified as spam.

Figure 6C:
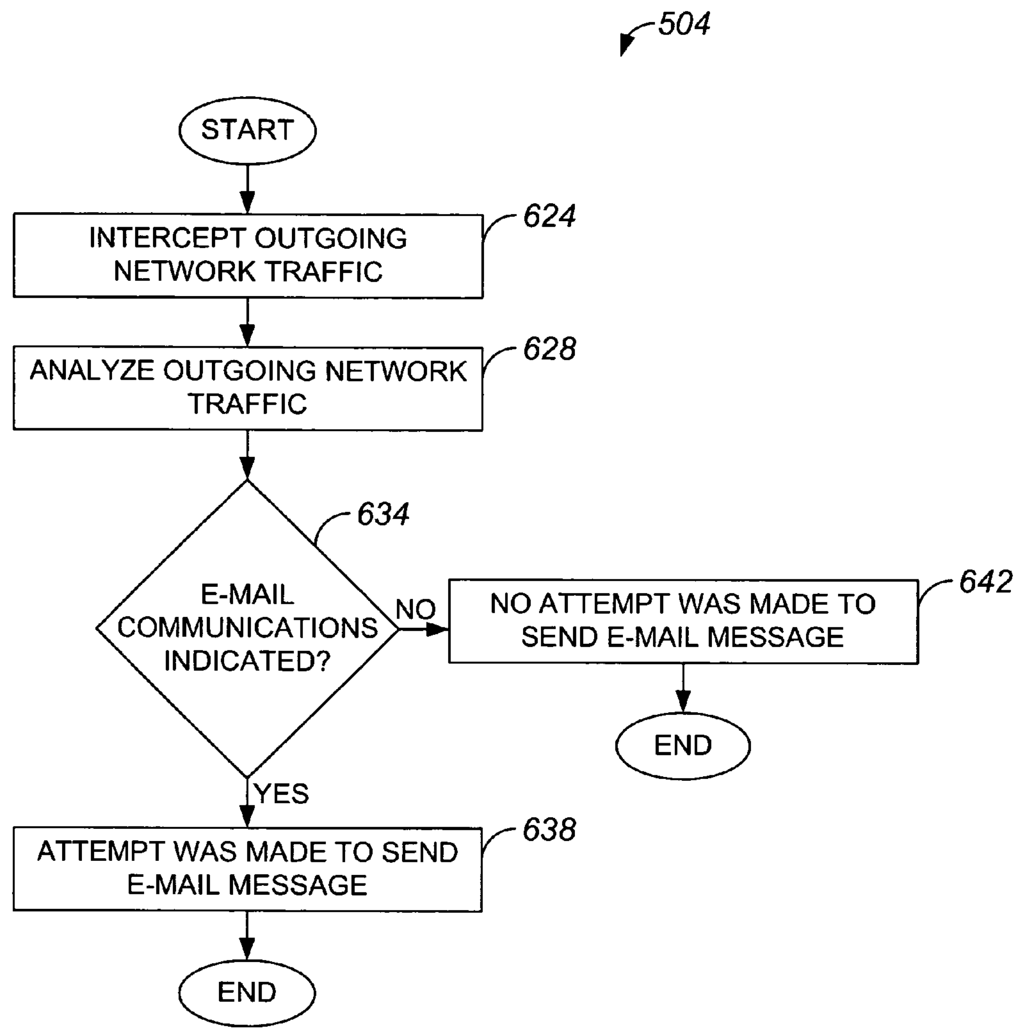
FIG. 6C is a process flow diagram which illustrates one method of detecting an attempt to send an e-mail message, e.g., step 504 of FIG. 6A, in accordance with an embodiment of the present invention.

The detection of an attempt to send an e-mail message will be described with respect to FIG. 6C. FIG. 6C is a process flow diagram which illustrates one method of detecting an attempt to send an e-mail message, e.g., step 504 of FIG. 6A, in accordance with an embodiment of the present invention. A process 504 begins at step 624 in which outgoing network traffic is intercepted from an outgoing network traffic path. The outgoing network traffic is intercepted, in one embodiment, by a packet capture module, e.g., packet capture module 470 of FIG. 5, that captures packets that are being sent by the local machine. After the outgoing network traffic is intercepted, the intercepted outgoing network traffic is analyzed in step 628. Analyzing the outgoing network traffic often includes identifying whether the network traffic is traffic of a mail transfer protocol, e.g., a simple mail transfer protocol (SMTP), or is non-mail traffic. Other mail transfer protocols other than a SMTP may be used. Such mail transfer protocols include, but are not limited to, an internet message access protocol (IMAP), a post office protocol (POP) such as POP3, and an HTTP protocol, as well as protocols associated with a messaging application programming interface (MAPI).

A determination is made in step 634 as to whether e-mail communications are indicated by the analysis of the intercepted outgoing network traffic. If e-mail communications are not indicated, then the indication is that the intercepted outgoing network traffic was non-mail traffic. As such, in step 642, it is noted that no attempt was made to send an e-mail message, and the process of detecting an attempt to send an e-mail message is completed. It should be understood that in general, the non-mail traffic that was intercepted is returned to the outgoing network traffic path and allowed to complete transmission.

Returning to step 634, if the determination is that e-mail communications are indicated, then it is noted that an attempt was made to send an e-mail message in step 638. In other words, an attempt to send an e-mail message is detected in step 638. After it is noted that an attempt to send an e-mail message was made, the process of detecting an attempt to send an e-mail message is completed.

Figure 7:
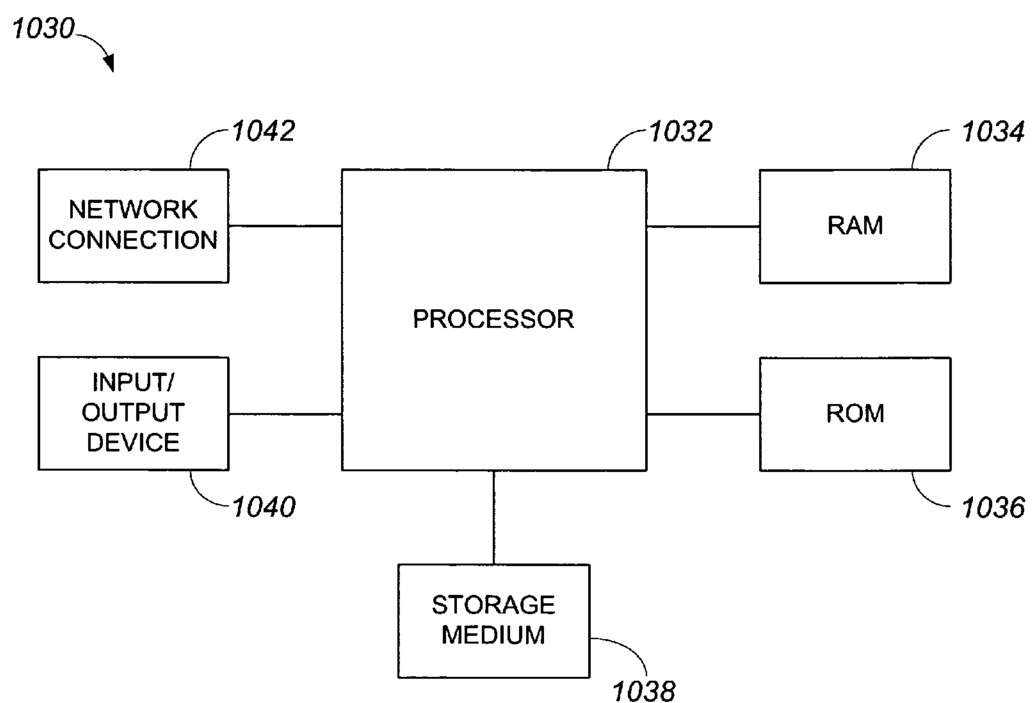
FIG. 7 is a block diagram representation of a computing system suitable for implementing the present invention.

FIG. 7 illustrates a typical, general purpose computing device or computer system suitable for implementing the present invention. A machine or a computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media, including both transitory computer-readable media and non-transitory computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as, for example, a database, a hard disk, a flash memory, a USB device, or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM or a DVD may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, in addition to determining whether a user interaction event has occurred within a particular time period before an attempt to send an outgoing e-mail message, a determination may additionally be made regarding the content of the outgoing e-mail message. That is, a heuristic comparison involving the content of the outgoing e-mail message may further increase the likelihood that spam e-mail messages are prevented from being transmitted.

The spam e-mail detector of the present invention is generally arranged to be used in addition to other anti-spam applications, as well as in addition to anti-virus applications. That is, a spam e-mail detector as described above may be used to supplement other spam combating mechanisms in a local machine.

A spam e-mail detector may be configured such that certain automatically sent e-mail messages are processed as legitimate even in the event that there has been no user activity on a local machine that sends the e-mail messages within an intent interval. In other words, a spam e-mail detector may generally be arranged to enable prescheduled or periodic e-mail messages such as cron or automatic e-mail messages that are likely to be legitimate to pass through the spam e-mail detector. For example, a spam e-mail detector may be arranged such that a user or a system administrator may configure the spam e-mail detector to allow e-mail messages sent from a particular application to substantially always pass through the spam e-mail detector. Methods used to configure the spam e-mail detector may include, but are not limited to, modifying an input file that lists applications from which cron or automatic e-mail messages are expected to be sent.

If a spam e-mail detector is configured to allow intentional cron or automatic e-mail messages, when outgoing network traffic is intercepted and analyzed, the outgoing network traffic may be analyzed to determine the source of the outgoing network traffic. Analyzing the outgoing network traffic in such a situation may entail identifying the particular application from which an e-mail communication was sent, after first determining that an e-mail communication is indicated. If the particular application is one that produces e-mail messages that are substantially always allowed to pass through the spam e-mail detector, then the e-mail communication that was intercepted may be allowed to complete transmission, i.e., regardless of whether an intent interval was violated.

User interaction events have been described as being used in a determination of whether an out-going e-mail message is likely to be spam. In general, interaction events other than user interaction events may be used as a measure of whether an e-mail message is potentially spam. That is, a machine activity detector such as machine activity detector 414 of FIG. 4 may be used to monitor activities or interactions that are not necessarily initiated by a user or a human.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method for processing a first e-mail message on a system, the system being arranged to transmit e-mail messages, the system including at least one input device, the method comprising:

identifying an attempt to transmit the first e-mail message;

determining whether an interaction event has occurred within a given time interval, the given time interval being measured beginning before the attempt to transmit the first e-mail message is identified;

performing a comparison utilizing content of the first e-mail message to determine whether the first e-mail message is likely legitimate;

preventing the first e-mail message from being transmitted if it is determined that the interaction event has not occurred within the given time interval and if the comparison indicates that the first e-mail message is likely not legitimate; and allowing the first e-mail message to be transmitted if it is determined that the interaction event has not occurred within the given time interval and if the comparison indicates that the first e-mail message is likely legitimate, wherein the interaction event is a user interaction event, and determining whether the user interaction event has occurred within the given time interval includes:

obtaining a timestamp associated with the user interaction event, the timestamp being arranged to indicate a time associated with an occurrence of the user interaction event;

determining a first time, the first time being a time associated with the attempt to transmit the first e-mail message; and determining if the difference between the first time and the timestamp exceeds the given time interval, wherein if the difference between the first time and the timestamp exceeds the given time interval, it is determined that the user interaction event has not occurred within the given time interval.

2. The method of claim 1 wherein identifying the attempt to transmit the first e-mail message includes:

capturing at least one packet associated with the first e-mail message; and identifying the at least one packet as having a protocol associated with the e-mail messages.

3. The method of claim 2 wherein the protocol is one selected from the group including a simple mail transfer protocol (SMTP), an internet message access protocol (IMAP), a post office protocol (POP), an HTTP protocol, and a protocol associated with a messaging application programming interface (MAPI).

4. The method of claim 1 wherein the user interaction event is a most recent user interaction event associated with the system.

5. The method of claim 1 wherein the timestamp associated with the user interaction event is obtained from a database.

6. The method of claim 1 wherein the at least one input device is a keyboard, and the interaction event is a keyboard activity.

7. The method of claim 1 wherein the at least one input device is a mouse, and the interaction event is a mouse click.

8. The method of claim 1 further including:

transmitting the first e-mail message if it is determined that the interaction event has occurred within the given time interval.

9. The method of claim 1 further including identifying the first e-mail message as being a spam e-mail message if it is determined that the interaction event has not occurred within the given time interval.

10. The method of claim 1 wherein the system is a first computing system arranged to transmit the e-mail messages to a second computing system, and where preventing the first e-mail message from being transmitted if it is determined that the interaction event has not occurred within the given time interval includes preventing the first e-mail message from being transmitted by the first computing system to the second computing system and received by the second computing system.

11. The method of claim 10 wherein the interaction event is performed by the first computing system.

12. The method of claim 1 wherein the system is a first computing system arranged to transmit the e-mail messages across a network to a second computing system, and wherein identifying an attempt to transmit the first e-mail message includes identifying an attempt to transmit the first-e-mail message from the first computing system across the network.

13. The method of claim 1 wherein the given time interval is a predetermined time interval that ends when the attempt to transmit the first e-mail message is identified.

14. The method of claim 1 wherein determining whether the interaction event has occurred within the given time interval includes determining whether the interaction event has occurred before the attempt to transmit the first e-mail is identified.

15. The method of claim 1 wherein the given time interval being measured beginning before the attempt to transmit the first email is identified is such that the given time interval is measured beginning when the first e-mail is composed.

16. The method of claim 15 wherein the given time interval ends when the attempt to transmit the first e-mail message is identified.

17. A non-transitory computer-readable medium for storing computer codes for processing a first e-mail message, the computer codes being executable by a processor, the computer codes comprising:

computer code that causes an attempt to transmit the first e-mail message to be identified;

computer code that causes a determination of whether an interaction event has occurred within a given time interval, the given time interval being measured beginning before the attempt to transmit the first e-mail message is identified;

computer code that performs a comparison utilizing content of the first e-mail message to determine whether the first e-mail message is likely legitimate;

computer code that prevents the first e-mail message from being transmitted if it is determined that the interaction event has not occurred within the given time interval and if the comparison indicates that the first e-mail message is likely not legitimate; and computer code that allows the first e-mail message to be transmitted if it is determined that the interaction event has not occurred within the given time interval and if the comparison indicates that the first e-mail message is likely legitimate, wherein the interaction event is a user interaction event, and computer code that cause the determination of whether the user interaction event has occurred within the given time interval includes:

computer code that obtains a timestamp associated with the user interaction event, the timestamp being arranged to indicate a time associated with an occurrence of the user interaction event;

computer code that determines a first time, the first time being a time associated with the attempt to transmit the first e-mail message; and computer code that determines if the difference between the first time and the timestamp exceeds the given time interval, wherein if the difference between the first time and the timestamp exceeds the given time interval, it is determined that the user interaction event has not occurred within the given time interval.

18. The computer-readable medium for storing computer codes of claim 17 wherein the computer codes further include:

computer code that causes a time associated with an occurrence of the interaction even to be recorded, wherein the time is recorded as a timestamp; and computer code that causes the timestamp to be stored.

19. The computer-readable medium for storing computer codes of claim 17 wherein the computer codes further include:

computer code that causes at least one packet associated with the first e-mail message to be intercepted.

20. The computer-readable medium for storing computer codes of claim 19 wherein the computer codes further include:

computer code that causes wherein a protocol associated with the at least one packet to be identified, wherein if the protocol is identified as an e-mail protocol, the attempt to transmit the first e-mail message is detected.

21. The computer-readable medium for storing computer codes of claim 17 wherein the computer codes further include:

computer code that causes the user interaction event to be captured.

22. The computer-readable medium for storing computer codes of claim 18 wherein the computer codes further include:

computer code that causes a packet associated with the first e-mail message to be captured.

23. An apparatus for processing a first e-mail message generated by an application, the apparatus being arranged on a computing system, the computing system being a part of a network, the apparatus comprising:

a first activity detector, the first activity detector being arranged to detect an attempt to transmit the first e-mail message from the computing system over the network; and a second activity detector, the second activity detector being arranged to determine if an interaction event has occurred within a given time interval, the second activity detector further being arranged to perform a comparison utilizing content of the first e-mail message to determine whether the first e-mail is likely legitimate, the given time interval occurring before the attempt to transmit the first e-mail message is detected, wherein if it is determined that the interaction event has not occurred within the given time interval and if it is determined that the first e-mail is likely not legitimate, the first e-mail message is identified as being a spam e-mail message, wherein the interaction event is a user interaction event, and the second activity detector being arranged to determine if the user interaction event has occurred within the given time interval includes:

obtain a timestamp associated with the user interaction event, the timestamp being arranged to indicate a time associated with an occurrence of the user interaction event;

determine a first time, the first time being a time associated with the attempt to transmit the first e-mail message; and determine if the difference between the first time and the timestamp exceeds the given time interval, wherein if the difference between the first time and the timestamp exceeds the given time interval, it is determined that the user interaction event has not occurred within the given time interval.

24. A method for processing a first e-mail message on a system that is included in a network, the system being arranged to transmit e-mail messages over the network, the method comprising:

identifying an attempt to transmit the first e-mail message from the system over the network, wherein identifying the attempt to transmit the first e-mail message includes monitoring traffic on the network;

determining whether an event has occurred within a given time interval, the time interval being measured beginning before the attempt to transmit the first e-mail message is identified and ending when the attempt to transmit the first e-mail message is identified by the system;

performing a heuristic comparison using contents of the first email to determine a likelihood that the first e-mail message is spam;

identifying the first e-mail message as being spam if it is determined that the event has not occurred within the given time interval and if the heuristic comparison using the contents of the first e-mail message indicates the likelihood that the first email is spam; and identifying the first e-mail message as being legitimate if it is determined that the event has not occurred within the given time interval and if the heuristic comparison does not indicate the likelihood that the first e-mail message is spam, wherein the event is a user interaction event, and determining whether the user interaction event has occurred within the given time interval includes:

obtaining a timestamp associated with the user interaction event, the timestamp being arranged to indicate a time associated with an occurrence of the user interaction event;

determining a first time, the first time being a time associated with the attempt to transmit the first e-mail message; and determining if the difference between the first time and the timestamp exceeds the given time interval, wherein if the difference between the first time and the timestamp exceeds the given time interval, it is determined that the user interaction event has not occurred within the given time interval.

25. The method of claim 24 wherein the e-mail messages include prescheduled e-mail messages, and determining whether the event has occurred within the given time interval includes determining whether a prescheduled event has occurred within the given time interval.

26. The method of claim 25 wherein identifying the first e-mail message as being spam if it is determined that the event has not occurred within the given time interval includes identifying the first e-mail message as being spam if it is determined that the prescheduled event has not occurred within the given time interval.

27. The method of claim 24 wherein monitoring the traffic on the network includes the system intercepting the first e-mail message from an outgoing network traffic path.

28. A non-transitory computer-readable medium for storing computer codes for processing a first e-mail message, the computer codes being executable by a processor, the computer codes comprising:

computer code that causes an attempt to transmit the first e-mail message from a system over a network to be identified wherein the computer code that causes the attempt to transmit the first e-mail message to be identified includes computer code that causes traffic on the network to be monitored;

computer code that causes a determination of whether an event has occurred within a given time interval, the time interval being measured beginning before the attempt to transmit the first e-mail message is identified and ending when the attempt to transmit the first e-mail message is identified by the system;

computer code that causes a heuristic comparison using contents of the first email to be performed to determine a likelihood that the first e-mail message is spam;

computer code that causes the first e-mail message to be identified as being spam if it is determined that the event has not occurred within the given time interval and if the heuristic comparison using the contents of the first e-mail message indicates the likelihood that the first email is spam; and computer code that causes the first e-mail message to be identified as being legitimate if it is determined that the event has not occurred within the given time interval and if the heuristic comparison does not indicate the likelihood that the first e-mail message is spam, wherein the event is a user interaction event, and computer code that cause the determination of whether the user interaction event has occurred within the given time interval includes:

computer code that obtains a timestamp associated with the user interaction event, the timestamp being arranged to indicate a time associated with an occurrence of the user interaction event;

computer code that determines a first time, the first time being a time associated with the attempt to transmit the first e-mail message; and computer code that determines if the difference between the first time and the timestamp exceeds the given time interval, wherein if the difference between the first time and the timestamp exceeds the given time interval, it is determined that the user interaction event has not occurred within the given time interval.

29. The computer-readable medium for storing computer codes of claim 28 wherein the e-mail messages include prescheduled e-mail messages, and the computer code that causes the determination of whether the event has occurred within the given time interval includes computer code that causes a determination of whether a prescheduled event has occurred within the given time interval.

30. The computer-readable medium for storing computer codes of claim 29 wherein the computer code that causes the first e-mail message to be identified as being spam if it is determined that the event has not occurred within the given time interval includes computer code that causes the first e-mail message to be identified as being spam if it is determined that the prescheduled event has not occurred within the given time interval.

* * * * *